United States Patent
Max et al.

(10) Patent No.: US 10,466,064 B2
(45) Date of Patent: Nov. 5, 2019

(54) ODOMETRY METHOD FOR DETERMINING A POSITION OF A MOTOR VEHICLE, CONTROL DEVICE AND MOTOR VEHICLE

(71) Applicant: VOLKSWAGEN AG, Wolfsburg (DE)

(72) Inventors: Stephan Max, Gifhorn (DE); Kristian Weiß, Berlin (DE); Sascha Bauer, Berlin (DE); Mehmet Eylem Kirlangic, Wolfsburg (DE); Andreas Wege, Berlin (DE); Robert Konnopka, Berlin (DE); Lars Krüger, Schorfheide (DE); Jesko Klandt, Berlin (DE); Christian Tendyck, Berlin (DE)

(73) Assignee: Volkswagen AG (DE)

( * ) Notice: Subject to any disclaimer, the term of this patent is extended or adjusted under 35 U.S.C. 154(b) by 95 days.

(21) Appl. No.: 15/704,398

(22) Filed: Sep. 14, 2017

(65) Prior Publication Data

US 2018/0073891 A1 Mar. 15, 2018

(30) Foreign Application Priority Data

Sep. 15, 2016 (DE) .................. 10 2016 217 637

(51) Int. Cl.
*G01C 22/02* (2006.01)
*G01C 22/00* (2006.01)
(Continued)

(52) U.S. Cl.
CPC ............ *G01C 22/00* (2013.01); *B62D 13/06* (2013.01); *B62D 15/021* (2013.01);
(Continued)

(58) Field of Classification Search
CPC .......... G01C 22/00; G01C 22/02; G06T 7/74; G06T 7/277; G06T 7/248;
(Continued)

(56) References Cited

U.S. PATENT DOCUMENTS

| 5,122,955 A | * | 6/1992 | Ishikawa | ............... B62D 15/02 180/415 |
| 5,857,160 A | * | 1/1999 | Dickinson | ............ B60G 17/019 180/446 |

(Continued)

FOREIGN PATENT DOCUMENTS

| CN | 1541865 A | 11/2004 |
| CN | 101727754 A | 6/2010 |

(Continued)

OTHER PUBLICATIONS

Gustafsson, Automotive safety systems, 2009, IEEE, p. 32-47 (Year: 2009).*

(Continued)

*Primary Examiner* — McDieunel Marc
(74) *Attorney, Agent, or Firm* — Barnes & Thornburg LLP

(57) ABSTRACT

A method for determining a location of a motor vehicle, wherein a respective rotational position signal is received from a respective wheel sensor of at least one wheel, and a steering angle signal is received from a steering angle sensor of a steering device, and a wheel-based location estimation is determined, the respective rotational position signal and geometric data of the at least one wheel. A respective relative location of the motor vehicle with respect to at least one object arranged in the surroundings is detected, and a respective relative change in location with respect to the at least one object is determined during a movement of the motor vehicle, and a surroundings-based location estimation is determined, and a combined location estimation of the location is determined from the wheel-based and the surroundings-based location estimation.

27 Claims, 1 Drawing Sheet

(51) Int. Cl.
    *G06T 7/73*         (2017.01)
    *G06T 7/277*      (2017.01)
    *G06T 7/246*      (2017.01)
    *B62D 15/02*      (2006.01)
    *B62D 13/06*      (2006.01)

(52) U.S. Cl.
    CPC ......... *B62D 15/0285* (2013.01); *G01C 22/02* (2013.01); *G06T 7/248* (2017.01); *G06T 7/277* (2017.01); *G06T 7/74* (2017.01); *G06T 2207/10016* (2013.01); *G06T 2207/30241* (2013.01); *G06T 2207/30252* (2013.01)

(58) Field of Classification Search
    CPC . G06T 2207/30241; G06T 2207/10016; G06T 2207/30252; B62D 13/06; B62D 15/021; B62D 15/0285
    See application file for complete search history.

(56) References Cited

U.S. PATENT DOCUMENTS

| | | | |
|---|---|---|---|
| 7,689,321 B2 * | 3/2010 | Karlsson | G05D 1/0246 |
| | | | 318/103 |
| 9,110,470 B2 | 8/2015 | Karlsson et al. | |
| 9,519,289 B2 * | 12/2016 | Munich | G05D 1/0246 |
| 9,632,502 B1 * | 4/2017 | Levinson | G01S 7/4972 |
| 9,751,210 B2 * | 9/2017 | Fong | B25J 9/1602 |
| 2005/0182518 A1 | 8/2005 | Karlsson | |
| 2005/0234679 A1 * | 10/2005 | Karlsson | G05D 1/0272 |
| | | | 702/181 |
| 2009/0248305 A1 | 10/2009 | Nakano | |
| 2017/0078400 A1 * | 3/2017 | Binder | H04L 67/12 |
| 2017/0123421 A1 * | 5/2017 | Kentley | G01S 17/87 |
| 2018/0164827 A1 * | 6/2018 | Chu | G05D 1/0217 |
| 2018/0278694 A1 * | 9/2018 | Binder | H04L 67/12 |

FOREIGN PATENT DOCUMENTS

| | | |
|---|---|---|
| CN | 105142962 A | 12/2015 |
| DE | 102011014699 A1 | 9/2012 |
| DE | 102012107885 A1 | 2/2014 |
| DE | 102012112724 A1 | 6/2014 |
| EP | 2399239 A1 | 12/2011 |
| WO | 2014094766 A1 | 6/2014 |
| WO | 2016085717 A1 | 6/2016 |
| WO | 2016130719 A2 | 8/2016 |

OTHER PUBLICATIONS

Yang et al., Longitude force estimation for bandwidth conservative communication and vehicular monitoring, 2010, IEEE, p. 668-673 (Year: 2010).*
Kochem et al., Accurate local vehicle dead-reckoning for a parking assistance system, 2002, IEEE, p. 4297-4302 (Year: 2002).*
Green et al., Path tracking, obstacle avoidance and position estimation by an autonomous, wheeled planetary rover, 1994, IEEE, p. 1300-1305 (Year: 1994).*
Chirca et al., Autonomous Valet Parking System Architecture, 2015 IEEE 18th International Conference on Intelligent Transportation Systems, 2015, pp. 2619-2624.
Helmick et al., Slip Compensation for a Mars Rover, IEEE/RSJ International Conference on Intelligent Robots and Systems, 2005, pp. 2806-2813.
Rodriguez et al., An Embedded Multi-Modal System for Object Localization and Tracking, IEEE Intelligent Transportation Systems Magazine, Winter 2012, pp. 42-53.
Search Report for German Patent Application No. 10 2016 217 637.4, dated Apr. 28, 2017.

* cited by examiner

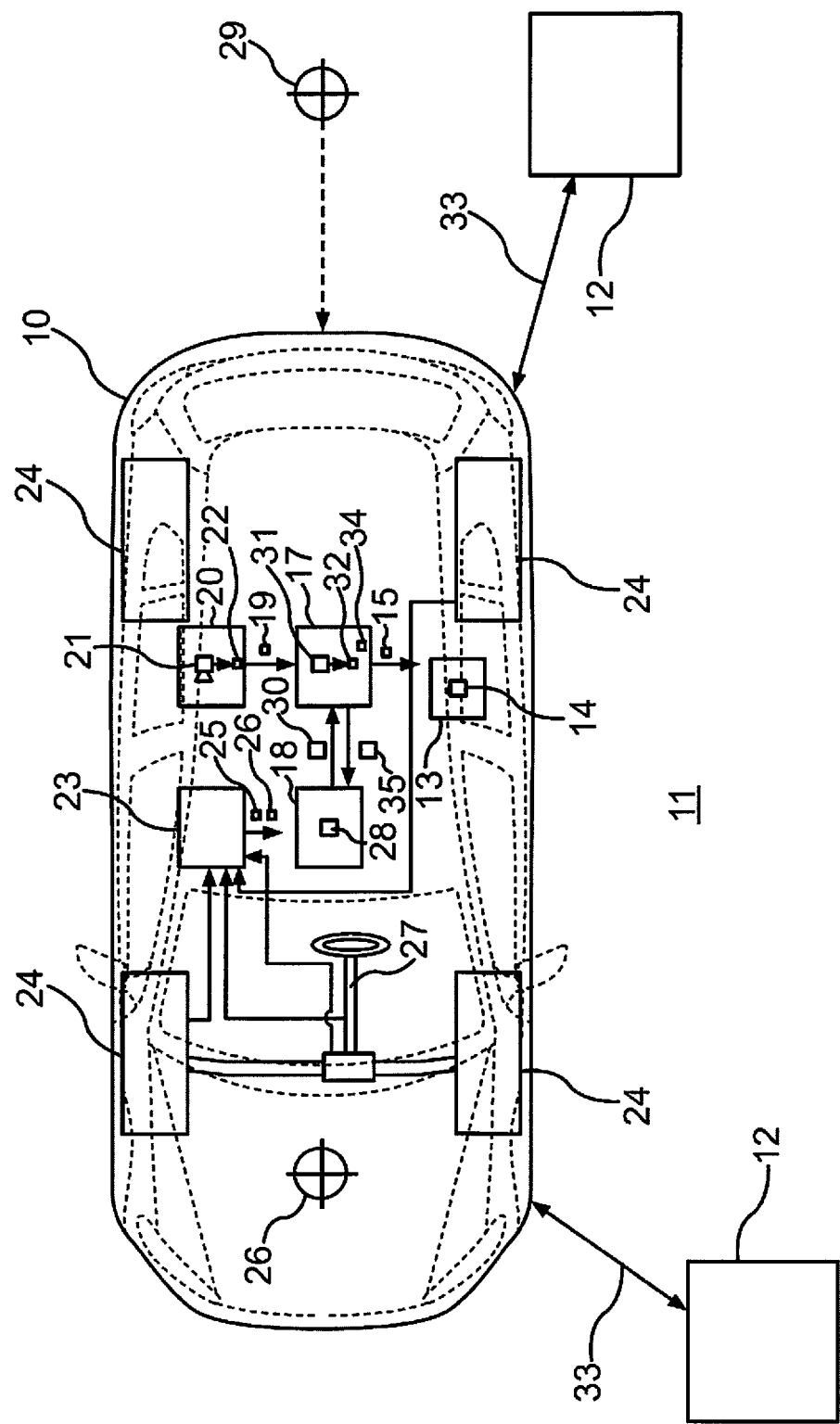

ODOMETRY METHOD FOR DETERMINING A POSITION OF A MOTOR VEHICLE, CONTROL DEVICE AND MOTOR VEHICLE

PRIORITY CLAIM

This patent application claims priority to German Patent Application No. 10 2016 217 637.4, filed 15 Sep. 2016, the disclosure of which is incorporated herein by reference in its entirety.

SUMMARY

Illustrative embodiments relate to a method for determining a location of a motor vehicle. The location is estimated partially on the basis of what is referred to as wheel odometry. Illustrative embodiments also relate to a control device for carrying out the disclosed method. Finally, illustrative embodiments also relate to a motor vehicle having the disclosed control device.

BRIEF DESCRIPTION OF THE DRAWINGS

In the text which follows, an exemplary embodiment is described, in which:

FIG. 1 shows a schematic illustration of an exemplary embodiment of the disclosed motor vehicle.

DETAILED DESCRIPTION

A driver assistance function, such as, for example, a parking-steering assistance function, can have a drift which can occur when the wheel odometry is used, since it relies on the wheel sensor system, i.e., the rotational position sensors of the wheels. The term drift means that a motor vehicle travels through, for example, a curved path even though according to the wheel odometry and therefore from the point of view of the driver assistance function it is traveling straight ahead. The reason for this is that the geometric data of the wheels do not always describe the current wheel circumference because the latter can change owing, for example, to abrasion or wear of the tires.

A further field of application of wheel odometry is known from DE 10 2012 107 885 A1. Accordingly, the course of a roadway is determined by a camera and the course is entered into a digital map of the surroundings. The location of the motor vehicle with respect to the edges of the roadway is then determined in the map of the surroundings by the odometric data of the motor vehicle. It is also necessary here for the odometry of the motor vehicle not to have the drift, since otherwise the motor vehicle could leave the lane.

DE 10 2011 014 699 B4 discloses a method for detecting objects in the surroundings of the motor vehicle, in which method a distance of the object form the motor vehicle is determined on the basis of what is referred to as the motion-stereo method. In this context, it is necessary to determine a distance which a motor vehicle has travelled between the recording times of two camera images. This can be done on the basis of odometry data. In this context, for the correct estimation of the distance it is also necessary to determine precisely the recording locations of the images on the basis of the odometric data. A drift would also lead to an incorrect estimation of the recording locations here.

WO 2014/094766 A1 discloses a method for determining the location of slippery places on a roadway. To be able to determine the location of a measured coefficient of friction in camera images, odometry information and time information are taken into account. This also requires correspondingly precise odometry.

Disclosed embodiments determine a position of a motor vehicle in the surroundings.

Disclosed embodiments make available a method for determining a location of a motor vehicle. The location describes here the location of the motor vehicle in the surroundings. The location can be defined, for example, by coordinates. During a movement of the motor vehicle, a respective rotational position signal which is dependent on a rotational position of the wheel is received from a respective wheel sensor of at least one wheel of the motor vehicle. Furthermore, a steering angle signal is received from a steering angle sensor of a steering device of the motor vehicle. It is therefore detected how far the at least one wheel rotates and what steering angle the motor vehicle has during the rotation. A wheel-based location estimation of the motor vehicle is determined as a function of the steering angle signal, the respective rotational position signal and as a function of geometric data of the at least one wheel, on the basis of predefinable wheel odometry which is known per se. The wheel odometry can be obtained from the prior art. Where the motor vehicle is rolling to is therefore determined as a function of the change of the rotational position of the at least one wheel and the steering angle which is adopted in the process. This yields the wheel-based location estimation. It can be expressed in relation or as a change in location of the motor vehicle with respect to an initial location or the last preceding location estimation, that is to say as a change in coordinates or as a change in location. The absolute location can then be derived therefrom.

Such wheel odometry can yield the drift. To estimate the location of the motor vehicle more precisely, the disclosed method provides that a respective relative location of the motor vehicle with respect to the at least one object arranged in the surroundings is detected or sensed as a function of a respective sensor signal of at least one surroundings sensor of the motor vehicle. The relative location of the motor vehicle with respect to at least one object in the surroundings of the motor vehicle is therefore determined. During the movement of the motor vehicle, a respective change in relative location with respect to the at least one object is determined. Therefore, in contrast to the case of the wheel-based location estimation, not only is a rotation or change in location of the at least one wheel considered within the motor vehicle, but also a relative change in location with respect to at the at least one vehicle-external object is determined. A surroundings-based location estimation is then determined as a further location estimation as a function of the respective relative change in location with respect to the at least one object. A wheel-based location estimation (wheel odometry) and a surroundings-based location estimation (change in the relative location) are therefore obtained. In the method, a combined location estimation of the location of the motor vehicle is determined from the wheel-based location estimation and the surroundings-based location estimation. If, for example, both the wheel-based location estimation and the surroundings-based location estimation respectively specified coordinates for describing the location of the motor vehicle, the combined location estimation can therefore be formed, for example, as a mean value from the two location estimations.

The disclosed embodiments provide that, in addition to the wheel odometry, odometry which is independent of geometric data of the at least one wheel is used, on the basis of a measurement of the respective relative location with respect to at least one object in the surroundings of the motor vehicle, to estimate the location of the motor vehicle. Therefore, if there is a fault or a deviation in the geometric data of the at least one wheel with respect to the real or actual geometric data or geometry values, this can be compensated by detecting the change in location with respect to the at least one object in the surroundings of the motor vehicle.

To detect the at least one relative location, for example, an ultrasound sensor and/or a radar sensor can be used as a suitable surroundings sensor. There may be provision that the at least one surroundings sensor comprises a camera. In other words, a visual odometry is used to assist the wheel odometry. In successive individual images of an image sequence which can be generated by the camera, in each case at least one image feature can be detected, and the respective image location thereof in the individual images can be determined. An image feature can be, for example, an edge or a colored surface or a texture or even a shape which describes an object, or a combination of these individual features. Algorithms for detecting and tracking image features are available in the prior art, e.g., under the term "maschinelles Sehen" [machine vision]. A movement of the motor vehicle which occurs between the recording times is determined as a function of a change in the respective image location of the at least one image feature in the successive individual images. In other words, the image sequence shows a relative movement of the at least one object in relation to the motor vehicle if the motor vehicle itself carries out a movement, that is to say rolls or drives or moves, and the camera is fixedly arranged on the motor vehicle. By tracking or determining the change in the image location of the at least one image feature it is possible to determine therefrom which movement the motor vehicle must have carried out. By checking whether a plurality of objects are moving relative to one another in the individual images it is possible to differentiate between stationary objects and moving objects.

As already stated, the wheel-based location estimation and the surroundings-based location estimation can be combined by forming a mean value. Disclosed embodiments provide that the wheel-based location estimation and the surroundings-based location estimation are combined by a Kalman filter or an information filter to form the combined location estimation. In other words, the two sources for an estimation are combined by a Kalman filter or an information filter. This allows the wheel-based location estimation and the surroundings-based location estimation to be taken into account and, as a result, the respectively more reliable or less variable location estimation are included or taken into account to a larger extent in the determination of the combined location estimation.

To obtain an even more precise estimation of the reliability of the respective location estimation, there may be provision that in addition to the surroundings-based location estimation, a location estimation of a current spatial position of the motor vehicle is also determined by the at least one surroundings sensor, in particular by a camera. The spatial position is differentiated here from the location in that a motor vehicle can stay in the same location (e.g., can have the same X, Y and Z coordinates), i.e., can stay in the same place, but can nevertheless change its spatial position in that it tilts or rotates, for example. Therefore, in total a 6D (6-dimensional) movement is determined by the at least one surroundings sensor, specifically the location (coordinates, for example, X, Y, Z) and the spatial angular position, that is to say the spatial orientation of the motor vehicle (for example, as a directional vector).

It can therefore be provided, for example, that a journey over an uneven piece of road which acts on merely one wheel or two wheels of the motor vehicle is detected on the basis of the location estimation. For example, travel over a curb stone or through a pothole, during which part of the motor vehicle is inclined, can be detected. In this context, the respective wheel which rolls over the curb stone or through the pothole carries out a rotational movement which is larger than during rolling over a level surface. Therefore, the rotational position signal of this wheel indicates a larger value than would occur in the case of rolling over a level surface. This can then be taken into account or compensated by taking into account the current spatial position of the motor vehicle during the combined location estimation. Additionally or alternatively to this, skidding of the motor vehicle can be detected on the basis of the location estimation while it remains undetected by the wheel-based location estimation. During the skidding, the wheel of the motor vehicle does not rotate or only does so to a lesser degree than the actual movement of the motor vehicle would require during rolling. It is therefore possible, for example, for the skidding of a wheel from a curb stone and/or spinning on ice to be detected on the basis of the location estimation. Correspondingly, this skidding can be taken into account during the determination of the combined location estimation.

Path planning and/or movement prediction on the basis of the combined location estimation of the motor vehicle can be expanded by the location estimation in that the position assumed by the motor vehicle in the current location is taken into account. Therefore, if travel over an uneven piece of roadway and resulting oblique position of the motor vehicle is taken into account, this can be used for the movement prediction. If skidding is detected, this skidding can be used to correct, for example, the path planning and/or the movement prediction.

Since two location estimations are now available, it is also possible to determine a difference between the wheel-based location estimation and the surroundings-based location estimation. At least one disclosed embodiment provides that the wheel odometry is calibrated as a function of the determined difference. As a result, a drift which is caused by the wheel odometry can be prevented or reduced during the wheel-based location estimation.

There is therefore provision that the geometric data are calibrated, specifically the geometric data relating to a respective tire circumference of the at least one wheel and/or the geometric data relating to a steering transmission ratio of the steering device. The calibration therefore reduces overall the difference between the wheel-based location estimation and the surroundings-based location estimation. Reducing the difference by the calibration therefore takes into account if tire circumferences of the at least one wheel and/or a steering transmission ratio of the steering device can change, for example, owing to wear or replacement of a component. It is therefore possible to compensate different tire circumferences. It is also possible to compensate wheel slip which is caused by elasticity of the respective tire of the at least one wheel and.

As already stated, the combined location estimation can also be used to make available a drive assistance function. Correspondingly, there is provision that a parking-steering assistance function and/or a trailer maneuvering assistance function are/is carried out on the basis of the combined estimation. The combined location estimation may be used at a velocity of less than 20 km/h. Here, the surroundings-based estimation by the at least one surroundings sensor, in particular by visual odometry, may make a precise change in location of the motor vehicle apparent.

To carry out the method, the disclosed embodiments make available a control device for a motor vehicle. The control device can be configured, for example, as a control unit of the motor vehicle. The control device comprises a processor device which is configured to carry out an embodiment of the disclosed method. The processor device for this purpose can have at least one microcontroller and/or at least one microprocessor. Furthermore, a program code can be made available in the processor device, which program code is configured to implement the embodiment of the disclosed method when it is executed by the processor device.

The disclosed motor vehicle is obtained by making available the disclosed control device in a motor vehicle. The disclosed motor vehicle can be configured as an automobile, in particular as a passenger automobile or truck.

In the exemplary embodiment, the described components of the embodiment respectively illustrate individual features which are to be considered independently of one another and which each also develop independently of one another, and are therefore also to be considered components either individually or in a combination other than that shown. Furthermore, other features which have already been described can also be added to the embodiment described.

The FIGURE shows a motor vehicle 10, in the surroundings 11 of which at least one object 12 (two objects 12 are illustrated by way of example) can be located. The motor vehicle 10 can be an automobile, in particular a passenger automobile or truck. An object 12 can be, for example, a curb stone or a street light or a road sign or a tree or another motor vehicle, to give only a few examples for the sake of illustration. A driver assistance system 13 can make available at least one driver assistance function 14 in the motor vehicle 10. For example, the driver assistance system 13 can manoeuver the motor vehicle into a parking space by a parking-steering assistance function as a driver assistance function 14, wherein the driver assistance system 13 can implement the lateral guidance of the motor vehicle 10 without the driver's involvement. A driver assistance function 14 can also be a trailer maneuvering assistance function in which the motor vehicle 10 also implements the longitudinal guidance and/or lateral guidance of the motor vehicle 10 during reversing with a trailer (not illustrated) without the driver's involvement. A corresponding driver assistance system 13 is known per se from the prior art.

The driver assistance system 13 requires a location estimation 15 of a current location 16 of the motor vehicle 10 to carry out or make available the driver assistance function 14. The location 16 is represented symbolically here, for example, as cross hairs in a front region of the motor vehicle 10. The location estimation 15 is a combined location estimation 15 of the position 16 which can be made available by a control device 17 of the motor vehicle 10. The control device 17 can combine here wheel odometry 18 with a respective sensor signal 19 of at least one surroundings sensor 20 of the motor vehicle 10. The at least one surroundings sensor 20 can comprise, for example, a camera 21 by which an image sequence 22 is generated by the surroundings 11 with the objects 12. The sensor signal 19 of the camera 21 can describe, for example, the image sequence 22.

The wheel odometry 18 can be based on a vehicle sensor system 23 which can make available, for example, a rotational position signal 25 for each of the respective wheels 24 of the motor vehicle 10, which rotational position signal 25 is dependent on a rotational movement of the respective wheel 24 or changes during such a movement. In addition, a steering angle signal 26 can describe a respective current steering angle of a steering device 27 of the motor vehicle 10. The steering device can be, for example, a steering system with a steering gear, for example, a steering rack steering gear, or an electrohydraulic power steering system. The wheel odometry 18 can determine, on the basis of the respective rotational position signal 25 of the wheels 24 and of the steering angle signal 26 and on the basis of geometric data 28 of the wheels 24 and the steering transmission ratio of the steering apparatus 27, how far the motor vehicle 10 has moved in relation to a preceding initial position 29, and in which direction the motor vehicle 10 has moved, with the result that the current location 16 can be made available therefrom as a wheel-based location estimation 30 of the control device 17.

A surroundings-based location estimation 32 can be generated on the basis of the image sequence 22 which is described by the sensor signal 19, e.g., by the control device 17 on the basis of an image analysis module 31 for machine vision. For this purpose, a movement of the object 12 in the image sequence 22 can be evaluated. The object 12 can be detected again or tracked on the basis of image features, for example, edges and/or colors and/or textures, in individual images of the image sequence 22.

The surroundings-based location estimation 32 can also describe a change in a respective relative location 33 of the motor vehicle 10 with respect to the at least one object 12 in relation to the initial location 29. When there is a known or given initial location 29, the current location 16 can therefore also be determined.

The combined location estimation 15 can then be determined or calculated or generated on the basis of the wheel-based location estimation 30 and the surroundings-based location estimation 32 by the control device 17, for example, on the basis of the formation of mean values or a Kalman filter or an information filter.

The accuracy of the location estimation 15 can therefore be increased in comparison with the location estimation 30 by the visual determination of the location of the objects 12 on the basis of the relative location-determining process by which the relative locations 33 are obtained, by automated extraction of image features or geographic features in the individual images of the image sequence 22.

In addition, by using the camera 21, path planning or movement prediction for the driver assistance function 14 can also be used by using the 6D position from the visual location-determining process.

If appropriate, calibration of the odometry-relevant parameters (tire circumferences, steering transmission ratio) can also be assisted or adapted. For this purpose, a difference 34 between the location estimation 30 and the location estimation 32 can correspondingly be determined. For example, calibration data 35 can be generated therefrom and the geometric data 28 can be adapted on the basis of the data.

It is therefore possible in the case of a trailer maneuvering assistance function as a driver assistance function 14 in a trajectory mode to follow the direction of the trailer by the driver assistance system 13, with the result that in an ideal case convergence to form a straight section of road or travel trajectory is obtained. By avoiding a drift, such as can be caused by the location estimations 30 of the wheel odometry 18, the degeneration of the travel trajectory into an arc is correspondingly avoided.

In the case of a parking-steering assistance function as a driver assistance function 14, an odometry error can cause errors when assuming the parking location by the motor vehicle 10. This would then have to be corrected by repeated parking operations. Since the assumption of a level surface during the wheel odometry 18 can be compensated by taking into account the 6D position (that is to say also the spatial position of the motor vehicle 10), it is possible, for example, even when traveling over a curb stone or a pothole, to correct the resulting deviation of the wheel-based location estimation from the actual location 16 by the surroundings-based location estimation 32.

Furthermore, when the motor vehicle is traveling it is also possible to detect wheel slip of the at least one wheel 24 by comparing the surroundings-based location estimation 32 and the wheel-based location estimation 30. This information can be used, for example, for a traction control process or for speed adaptation in the case of a fully automatic driver assistance function 14 (referred to as piloted driving).

Overall, the example shows how the disclosed embodiments make it possible to combine and use visual odometry and vehicle-specific odometry for other driver assistance systems.

LIST OF REFERENCE NUMBERS

10 Motor vehicle
11 Surroundings
12 Object
13 Driver assistance system
14 Driver assistance function
15 Location estimation
16 Location
17 Control device
18 Wheel odometry
19 Surroundings sensor
20 Camera
21 Image sequence
22 Vehicle sensor system
23 Wheel
24 Rotational position signal
25 Steering angle signal
26 Steering device
27 Geometric data
28 Initial location
29 Location estimation
30 Image analysis module
31 Location estimation
32 Relative location
33 Difference
34 Calibration data

The invention claimed is:

1. A method for determining a location of a transportation vehicle, the method comprising:
receiving, during movement of the transportation vehicle, a respective rotational position signal, dependent on a rotational position of the wheel, from a respective wheel sensor of at least one wheel; and
receiving a steering angle signal from a steering angle sensor of a steering device; and
determining a wheel-based location estimation of the transportation vehicle based on a predefined wheel odometry as a function of the steering angle signal, the respective rotational position signal and geometric data of the at least one wheel;
detecting, a respective relative location of the transportation vehicle with respect to at least one object arranged in the surroundings of the transportation vehicle as a function of a respective sensor signal of at least one surroundings sensor of the transportation vehicle;
determining, by a processor of the transportation vehicle, a respective relative change in location with respect to the at least one object during the movement of the transportation vehicle; and
determining, by the processor, a surroundings-based location estimation as a function of the respective relative change in location with respect to the at least one object, and a combined location estimation of the location of the transportation vehicle is determined from the wheel-based location estimation and the surroundings-based location estimation.

2. The method of claim 1, wherein the at least one surroundings sensor comprises a camera, and the method further comprises generating successive individual images of an image sequence by the camera, wherein in each generation of individual images, a respective image location of at least one image feature is determined and the movement of the transportation vehicle which occurs between recording times of the individual images is determined as a function of a change in the respective image location of the at least one image feature.

3. The method of claim 1, wherein the wheel-based location estimation and the surroundings-based location estimation are performed in combination in a Kalman filter or an information filter to form the combined location estimation.

4. The method of claim 1, further comprising, in addition to performing the surroundings-based location estimation, determining a position estimation of a current spatial position of the transportation vehicle by the at least one surroundings sensor.

5. The method of claim 4, further comprising detecting movement over an uneven piece of road which acts on merely one wheel or two wheels of the transportation vehicle and/or skidding, which remains undetected by the wheel-based position estimation, based on the position estimation.

6. The method of claim 4, wherein the position assumed by the transportation vehicle in the current location is taken into account path planning and/or movement prediction based on the combined location estimation of the transportation vehicle.

7. The method of claim 1, further comprising determining a difference between the wheel-based location estimation and the surroundings-based location estimation, and calibrating the wheel odometry as a function of the determined difference.

8. The method of claim 7, further comprising calibrating the geometric data relating to a respective tire circumference of the at least one wheel and/or relating to a steering transmission ratio of the steering device.

9. The method of claim 1, further comprising carrying out a parking-steering assistance function and/or a trailer maneuvering assistance function at a velocity of less than 20 km/h based on the combined location estimation.

10. A control device for a transportation vehicle, the control device comprising:
a processor configured to determine a location of a transportation vehicle based on a respective rotational position signal received during movement of the transportation vehicle and being dependent on a rotational position of the wheel, the respective rotational position signal being received from a respective wheel sensor of at least one wheel, wherein the processor apparatus receives a steering angle signal from a steering angle sensor of a steering device and determines a wheel-based location estimation of the transportation vehicle based on a predefined wheel odometry as a function of the steering angle signal, the respective rotational position signal and geometric data of the at least one wheel, wherein a respective relative location of the transportation vehicle is detected with respect to at least one object arranged in the surroundings of the transportation vehicle as a function of a respective sensor signal of at least one surroundings sensor of the transportation vehicle, and wherein the processor apparatus determines a respective relative change in location with respect to the at least one object during the movement of the transportation vehicle, determines a surroundings-based location estimation as a function of the respective relative change in location with respect to the at least one object, and determines a combined location estimation of the location of the transportation vehicle is determined from the wheel-based location estimation and the surroundings-based location estimation.

11. The control device of claim 10, wherein the at least one surroundings sensor comprises a camera, and the processor generates successive individual images of an image sequence by the camera, wherein in each generation of individual images, a respective image location of at least one image feature is determined and the movement of the transportation vehicle which occurs between recording times of the individual images is determined as a function of a change in the respective image location of the at least one image feature.

12. The control device of claim 10, further comprising a Kalman filter or an information filter that performs wheel-based location estimation and the surroundings-based location estimation in combination to form the combined location estimation.

13. The control device of claim 10, wherein the processor determines a position estimation of a current spatial position of the transportation vehicle by the at least one surroundings sensor.

14. The control device of claim 13, wherein the processor detects movement over an uneven piece of road which acts on merely one wheel or two wheels of the transportation vehicle and/or skidding, which remains undetected by the wheel-based position estimation, based on the position estimation.

15. The control device of claim 13, wherein the position assumed by the transportation vehicle in the current location is taken into account path planning and/or movement prediction based on the combined location estimation of the transportation vehicle.

16. The control device of claim 10, wherein the processor determines a difference between the wheel-based location estimation and the surroundings-based location estimation, and calibratin the wheel odometry as a function of the determined difference.

17. The control device of claim 16, wherein the control device calibrates the geometric data relating to a respective tire circumference of the at least one wheel and/or relating to a steering transmission ratio of the steering device.

18. The control device of claim 10, wherein the processor carries out a parking-steering assistance function and/or a trailer maneuvering assistance function at a velocity of less than 20 km/h based on the combined location estimation.

19. A transportation vehicle including a control device comprising:
a processor configured to determine a location of a transportation vehicle based on a respective rotational position signal received during movement of the transportation vehicle and being dependent on a rotational position of the wheel, the respective rotational position signal being received from a respective wheel sensor of at least one wheel, wherein the processor apparatus receives a steering angle signal from a steering angle sensor of a steering device and determines a wheel-based location estimation of the transportation vehicle based on a predefined wheel odometry as a function of the steering angle signal, the respective rotational position signal and geometric data of the at least one wheel, wherein a respective relative location of the transportation vehicle is detected with respect to at least one object arranged in the surroundings of the transportation vehicle as a function of a respective sensor signal of at least one surroundings sensor of the transportation vehicle, and wherein the processor apparatus determines a respective relative change in location with respect to the at least one object during the movement of the transportation vehicle, determines a surroundings-based location estimation as a function of the respective relative change in location with respect to the at least one object, and determines a combined location estimation of the location of the transportation vehicle is determined from the wheel-based location estimation and the surroundings-based location estimation.

20. The transportation vehicle of claim 19, wherein the at least one surroundings sensor comprises a camera, and the processor generates successive individual images of an image sequence by the camera, wherein in each generation of individual images, a respective image location of at least one image feature is determined and the movement of the transportation vehicle which occurs between recording times of the individual images is determined as a function of a change in the respective image location of the at least one image feature.

21. The transportation vehicle of claim 19, further comprising a Kalman filter or an information filter that performs wheel-based location estimation and the surroundings-based location estimation in combination to form the combined location estimation.

22. The transportation vehicle of claim 19, wherein the processor determines a position estimation of a current spatial position of the transportation vehicle by the at least one surroundings sensor.

23. The transportation vehicle of claim 22, wherein the processor detects movement over an uneven piece of road which acts on merely one wheel or two wheels of the transportation vehicle and/or skidding, which remains undetected by the wheel-based position estimation, based on the position estimation.

24. The transportation vehicle of claim 22, wherein the position assumed by the transportation vehicle in the current location is taken into account path planning and/or movement prediction based on the combined location estimation of the transportation vehicle.

25. The transportation vehicle of claim 19, wherein the processor determines a difference between the wheel-based location estimation and the surroundings-based location estimation, and calibratin the wheel odometry as a function of the determined difference.

26. The transportation vehicle of claim 25, wherein the control device calibrates the geometric data relating to a respective tire circumference of the at least one wheel and/or relating to a steering transmission ratio of the steering device.

27. The transportation vehicle of claim 19, wherein the processor carries out a parking-steering assistance function and/or a trailer maneuvering assistance function at a velocity of less than 20 km/h based on the combined location estimation.

* * * * *